UNITED STATES PATENT OFFICE 2,496,660

PRODUCTION OF AROMATIC NITRILES

William I. Denton, Woodbury, and Richard B. Bishop, Haddonfield, N. J., assignors to Socony-Vacuum Oil Company, Incorporated, a corporation of New York No Drawing. Application August 15, 1947, Serial No. 768,933

7 Claims. (Cl. 260—465)

This invention relates to a process for producing aromatic nitriles and is more particularly concerned with a catalytic process for producing aromatic nitriles from aromatic hydrocarbons.

Aromatic nitriles are organic compounds containing combined nitrogen. Their formula may be represented thus:

$$R\text{—}C\equiv N$$

in which R is an aryl group. These compounds are very useful since they can be converted readily to many valuable products such as acids, amines, aldehydes, esters, etc.

As is well known to those familiar with the art, several processes have been proposed for the preparation of aromatic nitriles. In general, however, all of these processes have been disadvantageous from one or more standpoints, namely, the relatively high cost of the reactants employed and/or the toxic nature of some of the reactants and/or the number of operations involved in their ultimate preparation. For example, aromatic nitriles have been synthesized by reacting alkali cyanides with aromatic sulfonates or with aromatic-substituted alkyl halides; by reacting more complex cyanides such as potassium cuprous cyanide, with diazonium halides; by reacting isothiocyanates with copper or with zinc dust; and by reacting aryl aldoximes with acyl halides.

We have now found a process for producing aromatic nitriles which is simple and inexpensive, and which employs nontoxic reactants.

We have discovered that aromatic nitriles can be prepared by reacting aromatic hydrocarbons in which at least one nuclear hydrogen is replaced by a univalent aliphatic hydrocarbon radical, with ammonia at elevated temperatures, in the presence of a catalytic material containing a metallic salt of molybdic acid.

Our invention is to be distinguished from the conventional processes for the production of hydrogen cyanide wherein carbon compounds, such as carbon monoxide, methane, and benzene, are reacted with ammonia at elevated temperatures in the presence of alumina, nickel, quartz, clays, oxides of thorium and cerium, copper, iron oxide, silver, iron, cobalt, chromium, aluminum phosphate, etc. The process of the present invention is also to be distinguished from the processes of the prior art for the production of amines wherein hydrocarbons are reacted with ammonia at high temperatures, or at lower temperatures in the presence of nickel.

Accordingly, it is an object of the present invention to provide a process for the production of aromatic nitriles. Another object is to afford a catalytic process for the production of aromatic nitriles. An important object is to provide a process for producing aromatic nitriles which is inexpensive and commercially feasible. A specific object is to provide a process for producing aromatic nitriles from alkyl- or alkenyl-substituted aromatic hydrocarbons. Other objects and advantages of the present invention will become apparent to those skilled in the art from the following description.

Broadly stated, our invention provides an inexpensive and commercially feasible process for the production of aromatic nitriles, which comprises reacting an aromatic hydrocarbon in which at least one nuclear hydrogen is replaced by a univalent aliphatic hydrocarbon radical, with ammonia, in the gaseous phase and at elevated temperatures, in the presence of catalytic material containing a metal salt of molybdic acid.

Generally speaking, any alkyl- or alkenyl-substituted aromatic hydrocarbon is suitable as the hydrocarbon reactant in the process of our invention. The alkyl- or alkenyl-substituted aromatic hydrocarbons to be used in the process of our invention may be derived from any suitable source as is well known to those familiar with the art. Although any alkyl- or alkenyl-substituted aromatic hydrocarbon may be employed for our purpose, we prefer to use the methyl-substituted aromatic hydrocarbons, or those in which the substituent or at least one of the substituents is unsaturated, and more particularly, the alkenyl-substituted benzenes. Examples are toluene, xylenes, and trimethyl benzenes, and styrene. It is to be understood, however, that hydrocarbon fractions containing alkyl- or alkenyl-substituted benzenes may also be utilized in our process. It is to be understood also, that other alkyl- or alkenyl-substituted aromatic hydrocarbons, such as methyl-substituted naphthalenes, and fractions containing the same may be employed in the present process.

The proportions of reactants, i. e., aromatic hydrocarbon and ammonia, used in our process may be varied over a wide range with little effect on the conversion per pass and ultimate yield. In general, the charge of reactants may contain as little as two mol per cent or as much as ninety-eight mol per cent of alkyl- and/or alkenyl-substituted aromatic hydrocarbons. In practice, however, we use charges containing between about twenty mol per cent and about ninety mol per cent of aromatic hydrocarbon, and ordinarily, we prefer to use charges containing a molar excess of ammonia over the aromatic hydrocarbon reactant.

We have found that the catalysts to be used to produce the aromatic nitriles, by reacting alkyl- or alkenyl-substituted aromatic hydrocarbons with ammonia, may be any salts of molybdic acid, such, for example, as uranyl molybdate, ferrous and ferric molybdates, sodium molybdate, dimolybdate, trimolybdate, tetramolybdate, octamolybdate and decamolybdate, the corresponding potassium molybdates and nickel, cobalt, lead and copper molybdates. In general, we prefer to use uranyl molybdate or molybdic acid salts of metals of the iron group, that is, of iron, nickel and cobalt. Of these, ferric molybdate and uranyl molybdate are generally preferred.

While molybdic acid metal salt catalysts are effective when used per se, they generally possess additional catalytic activity when used in conjunction with the well known catalyst supports, such as alumina, silica gel, Carborundum, pumice, clays and the like. We especially prefer to use activated alumina ($Al_2O_3$) as a catalyst support, and we have found that a catalyst comprising uranyl molybdate or ferric molybdate supported on activated alumina is particularly useful for our purpose. Without any intent of limiting the scope of the present invention, it is suspected that the enhanced catalytic activity of the supported catalysts is attributable primarily to their relatively large surface area.

The concentration of metal molybdate in the supported catalysts influences the conversion per pass. In general, the conversion per pass increases with increase in the concentration of the molybdate. For example, we have found that a catalyst comprising twenty parts by weight of ferric molybdate on eighty parts by weight of activated alumina is more effective than one comprising ten parts by weight of ferric molybdate on ninety parts by weight of activated alumina. It is to be understood, however, that supported catalysts containing larger or smaller amounts of molybdate may be used in our process.

We have found also that in order to obtain initial maximum catalytic efficiency, the catalysts should be conditioned prior to use in the process. As defined herein, conditioned catalysts are those which have been exposed to ammonia or hydrogen, or both, for a period of time, several minutes to several hours, depending upon the quantity, at temperatures varying between about 800° F. and about 1300° F. However, if desired, the conditioning treatment may be dispensed with inasmuch as the catalyst becomes conditioned during the initial stages of our processes when the catalyst comes in contact with the ammonia reactant.

In operation, the catalysts become fouled with carbonaceous material which ultimately affects their catalytic activity. Accordingly, when the efficiency of the catalyst declines to a point where further operation becomes uneconomical or disadvantageous from a practical standpoint, the catalyst may be regenerated as is well known in the art, by subjecting the same to a careful oxidation treatment, for example, by passing a stream of air or air diluted with flue gases over the catalyst under appropriate temperature conditions and for a suitable period of time, such as the same period of time as the catalytic operation. Preferably, the oxidation treatment is followed by a purging treatment, such as passing over the catalyst a stream of purge gas, for example, nitrogen, carbon dioxide, hydrocarbon gases, or the like.

The reaction or contact time, that is, the period of time during which a unit volume of the reactants is in contact with a unit volume of catalyst, may vary between a fraction of a second and several minutes. Thus, the contact time may be as low as 0.01 second and as high as 20 minutes. We prefer to use contact times varying between 0.1 second and one minute, particularly, between 0.3 second and 30 seconds. It must be realized that these figures are at best estimates based on a number of assumptions. For all practical purposes, as in catalytic processes of the type of the present invention, the more reliable data on contact time is best expressed, as is well known in the art, in terms of liquid space velocities, in the present instance, the volume of liquid hydrocarbon reactant per volume of catalyst per hour. For example, at atmospheric pressure, we have found that the space velocities may be varied considerably and that velocities varying between about one-fourth and about four are quite satisfactory for the purposes of the present invention.

In general, the temperatures to be used in our process vary between about 850° F. and the decomposition temperature of ammonia (about 1250–1300° F.), and preferably, temperatures varying between about 925° F. and about 1075° F. The preferred temperature to be used in any particular operation will depend upon the nature of the aromatic hydrocarbon reactant used and upon the type of catalyst employed. Generally speaking, the higher temperatures increase the conversion per pass but they also increase the decomposition of the reactants thereby decreasing the ultimate yields of aromatic nitriles. Accordingly, the criteria for determining the optimum temperature to be used in any particular operation will be based on the nature of the aromatic hydrocarbon reactant, the type of catalyst, and a consideration of commercial feasibility from the standpoint of striking a practical balance between conversion per pass and losses as a result of decomposition.

The process of the present invention may be carried out at superatmospheric, atmospheric or subatmospheric pressures. Superatmospheric pressures are advantageous in that the unreacted charge materials condense more readily. Subatmospheric pressures appear to favor the reactions involved since the reaction products have a larger volume than the reactants, and hence, it is evident from the law of Le Chatelier-Braun that the equilibrium favors nitrile formation more at reduced pressures. However, such pressures reduce the throughput of the reactants and present increased difficulties in recycling unreacted charge materials. Therefore, atmospheric pressure or superatmospheric pressure are preferred. Generally, pressures above one hundred pounds per square inch are unnecessary and less desirable.

The reaction mechanism involved in the process of the present invention is not, at the present time, fully understood. Fundamentally, the simplest possible method of making aromatic nitriles is to introduce nitrogen directly into the alkyl or alkenyl radical of the alkyl- or alkenyl-substituted aromatic hydrocarbon molecule, thereby avoiding intermediate steps with their accompanying increased cost. In our process, we have noted that considerable amounts of hydrogen are evolved; hence, it is postulated, without any intent of limiting the scope of the present invention, that the aromatic nitriles of this invention are formed in accordance with the following equations, using toluene, xylene and mesitylene as examples:

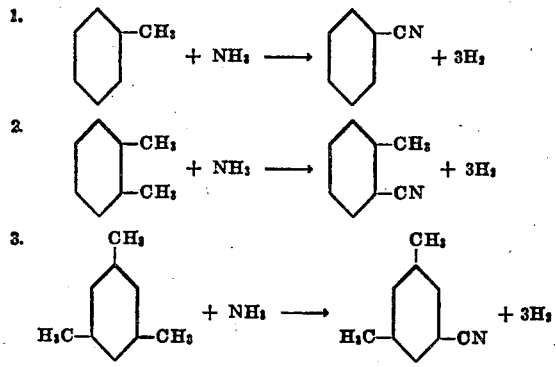

The present process may be carried out by making use of any of the well-known techniques for operating catalytic reactions in the vapor phase effectively. By way of illustration, toluene and ammonia may be brought together in suitable proportions and the mixture vaporized in a preheating zone. The vaporized mixture may then be introduced into a reaction zone containing a catalyst of the type defined above. The reaction zone may be a chamber of any suitable type useful in contact-catalytic operations; for example, a catalyst bed contained in a shell, or a shell through which the catalyst flows concurrently, or countercurrently, with the reactants. The vapors of the reactants are maintained in contact with the catalyst at a predetermined elevated temperature and for a predetermined period of time, both as set forth hereinbefore, and the resulting reaction mixture is passed through a condensing zone into a receiving chamber. It will be understood that when the catalyst flows concurrently, or countercurrently, with the reactants in the reaction chamber, the catalyst will be thereafter suitably separated from the reaction mixture by filtration or the like. The reaction mixture will be predominantly a mixture of benzonitrile, hydrogen, unchanged toluene, and unchanged ammonia. The benzonitrile and the unchanged toluene will be condensed in passing through the condensing zone and will be retained in the receiving chamber. Benzonitrile can be separated from the unchanged toluene by any of the numerous and well known separation procedures, such as fractional distillation. Similarly, the uncondensed hydrogen and unchanged ammonia can be separated from each other. The unchanged toluene and ammonia can be recycled, with or without fresh toluene and ammonia, to the process.

It will be apparent that the process may be operated as a batch or discontinuous process as by using a catalyst-bed-type reaction chamber in which the catalytic and regeneration operations alternate. With a series of such reaction chambers, it will be seen that as the catalytic operation is taking place in one or more of the reaction chambers, regeneration of the catalyst will be taking place in one or more of the other reaction chambers. Correspondingly, the process may be continuous when we use one or more catalyst chambers through which the catalyst flows in contact with the reactants. In such a continuous process, the catalyst will flow through the reaction zone in contact with the reactants and will thereafter be separated from the reaction mixture, as, for example, by accumulating the catalyst on a suitable filter medium, before condensing the reaction mixture. In a continuous process, therefore, the catalyst—fresh or regenerated and the reactants—fresh or recycle—will continuously flow through a reaction chamber.

The following detailed examples are for the purpose of illustrating modes of preparing aromatic nitriles in accordance with the process of our invention, it being clearly understood that the invention is not to be considered as limited to the specific alkyl aromatic hydrocarbon reactant disclosed hereinafter or to the manipulations and conditions set forth in the examples. As it will be apparent to those skilled in the art, a wide variety of other aromatic nitriles may be prepared by a suitable modification of the aromatic hydrocarbon reactant.

*Example I*

A catalyst consisting of 10% uranyl molybdate and 90% activated alumina was prepared as follows: 250 g. of 4–8 mesh activated alumina was soaked with a solution containing sufficient uranyl nitrate to give the desired final catalyst concentration. The water was evaporated from the solution and the catalyst oven-dried at 150° C. The catalyst was then soaked in a solution containing sufficient ammonium molybdate to react with the uranyl nitrate thus giving uranyl molybdate. The water was evaporated from the solution and the catalyst oven-dried again at 150° C. The catalyst was then muffled at 900° F. for five hours.

Toluene and ammonia were passed over the above catalyst at 1025° F., atmospheric pressure, space velocity of 1.5 (1.2 seconds contact time) and a ratio of two mols of ammonia to one of toluene. The conversion per pass to benzonitrile was seven per cent by weight based on the toluene charged.

*Example II*

A catalyst consisting of 14% ferric molybdate and 86% activated alumina was prepared as follows: A hydrosol of ferric molybdate was prepared by mixing the proper amount of ammonium molybdate and ferric nitrate, 500 cc. of activated alumina, 4–8 mesh, was added to the hydrosol, and the sol was soaked up by the activated alumina. The water was then evaporated and the catalyst washed free of nitrate and dried. The catalyst was next muffled at 900° F. for five hours.

Toluene and ammonia were passed over the above catalyst at a temperature of 1025° F., atmospheric pressure, space velocity of 1.5 (contact time of 1.2 seconds) using two mols of ammonia per mol of toluene. The conversion per pass to benzonitrile was 7.3% by weight based on the toluene charged.

It will be apparent that the present invention provides an efficient, inexpensive and safe process for obtaining aromatic nitriles, particularly those of the benzene series. Our process is of considerable value in making available relatively inexpensive aromatic nitriles which are useful, for example, as intermediates in organic synthesis.

The present application is a continuation-in-part of application Serial Number 539,032, filed June 6, 1944, now abandoned.

Although the present invention has been described in conjunction with preferred embodiments, it is to be understood that modifications

What is claimed is:

1. A process for manufacturing aromatic nitriles, which comprises contacting an aromatic hydrocarbon selected from the class consisting of toluene, the xylenes, the trimethyl benzenes and styrene, with ammonia, in gaseous phase, at a temperature falling within the range varying between about 850° F. and about 1250° F., and in the presence of a metal salt of molybdic acid selected from the group consisting of uranyl molybdate and iron molybdate.

2. A process for manufacturing aromatic nitriles, which comprises contacting an aromatic hydrocarbon selected from the class consisting of toluene, the xylenes, the trimethyl benzenes and styrene, with ammonia, in gaseous phase, at a temperature falling within the range varying between about 850° F. and about 1250° F., and in the presence of a metal salt of molybdic acid selected from the group consisting of uranyl molybdate and iron molybdate, supported on a catalyst support.

3. A process for manufacturing aromatic nitriles, which comprises contacting an aromatic hydrocarbon selected from the class consisting of toluene, the xylenes, the trimethyl benzenes and styrene, with ammonia, in gaseous phase, at a temperature falling within the range varying between about 850° F. and about 1250° F., and in the presence of a metal salt of molybdic acid selected from the group consisting of uranyl molybdate and iron molybdate, supported on activated alumina.

4. A process for manufacturing aromatic nitriles, which comprises contacting an aromatic hydrocarbon selected from the class consisting of toluene, the xylenes, the trimethyl benzenes and styrene, with ammonia, in gaseous phase, at a temperature falling within the range varying between about 925° F. and about 1075° F., and in the presence of a metal salt of molybdic acid selected from the group consisting of uranyl molybdate and iron molybdate.

5. A process for manufacturing aromatic nitriles, which comprises contacting an aromatic hydrocarbon selected from the class consisting of toluene, the xylenes, the trimethyl benzenes and styrene, with ammonia, in gaseous phase, at a temperature falling within the range varying between about 925° F. and about 1075° F., and in the presence of a metal salt of molybdic acid selected from the group consisting of uranyl molybdate and iron molybdate, supported on a catalyst support.

6. A process for manufacturing benzonitrile, which comprises contacting toluene with ammonia, in gaseous phase, at a temperature falling within the range varying between about 925° F. and about 1075° F., and in the presence of iron molybdate supported on activated alumina.

7. A process for manufacturing benzonitrile, which comprises contacting toluene with ammonia, in gaseous phase, at a temperature falling within the range varying between about 925° F. and about 1075° F., and in the presence of uranyl molybdate supported on activated alumina.

WILLIAM I. DENTON.
RICHARD B. BISHOP.

REFERENCES CITED

The following references are of record in the file of this patent:

UNITED STATES PATENTS

| Number | Name | Date |
|---|---|---|
| 1,920,795 | Jaeger | Aug. 1, 1933 |
| 1,934,838 | Andrussow | Nov. 14, 1933 |
| 2,331,968 | Forney | Oct. 19, 1943 |
| 2,381,709 | Apgar et al. | Aug. 7, 1945 |